A. LARSON.
SPOON AND FORK COMBINED.
APPLICATION FILED APR. 16, 1920.

1,351,046.

Patented Aug. 31, 1920.

Inventor:
Albert Larson.
By his Attorney.
A. M. Carlsen

UNITED STATES PATENT OFFICE.

ALBERT LARSON, OF MINNEAPOLIS, MINNESOTA.

SPOON AND FORK COMBINED.

1,351,046.
Specification of Letters Patent.
Patented Aug. 31, 1920.

Application filed April 16, 1920. Serial No. 374,486.

*To all whom it may concern:*

Be it known that I, ALBERT LARSON, a citizen of the United States, residing at Minneapolis, in the county of Hennepin and State of Minnesota, have invented a new and useful Spoon and Fork Combined, of which the following is a specification.

This invention relates to basting spoons, and the object is to provide a basting spoon the bowl of which is convertible into fork tines when so desired, and to provide means for spreading and closing and holding said tines rigidly in the desired relation to each other, as may be required for beating eggs, batter, or other substances or for using the tool as a fork. The invention is a further improvement upon the structure described in my application Serial No. 348,431, filed December 30, 1919, and allowed March 22, 1920, in which former case the outer tines are fixed to resilient arms or bow-springs, which in the present case are avoided.

In the accompanying drawing:—

Figure 1:
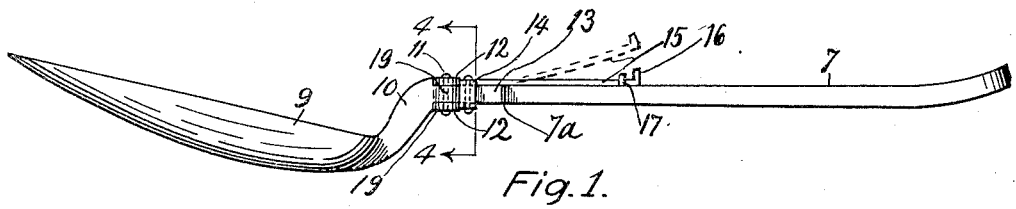
Figure 2:
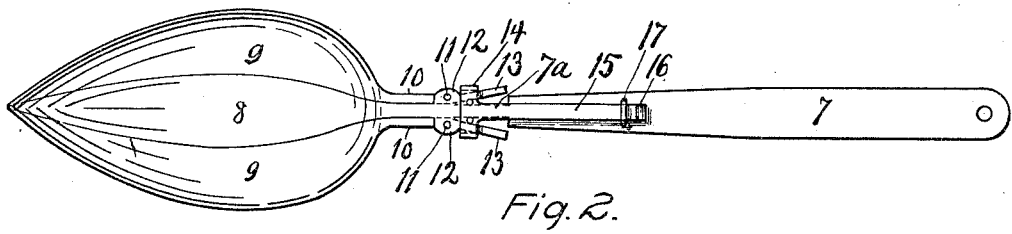
Figure 3:
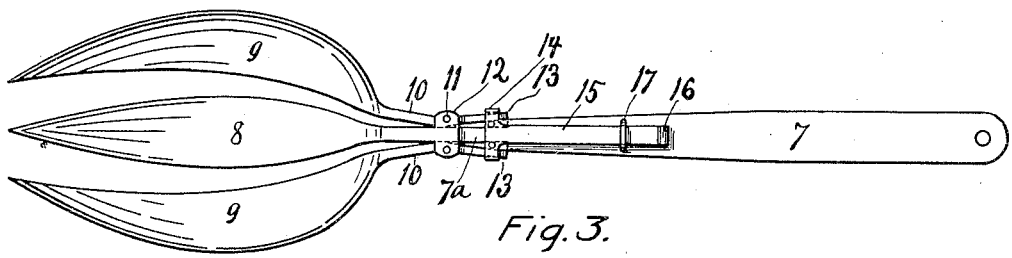
Figure 6:
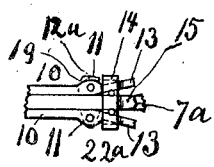
Figure 5:
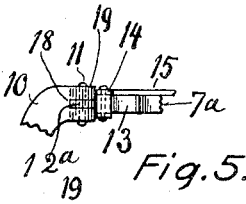
Figure 4:
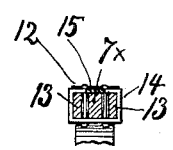

Figure 1 is an edge view of my combined spoon and fork. Fig. 2 is a plan view of the device with the parts of the bowl of the spoon in closed position. Fig. 3 is a view similar to Fig. 2 with the bowl spread into tines. Fig. 4 is a section on the line 4—4 in Fig. 1. Fig. 5 is a side view of the joint portion of the spoon slightly modified. Fig. 6 is a top view of Fig. 5.

Referring to the drawing by reference numerals, 7 designates the handle of the device and may be made of aluminum or other metal, preferably made integral with the middle member 8 of the bowl.

The side members 9 of the bowl are also made of similar metal and each provided with a rigid shank 10 swingable on a vertical pivot 11, fixed in a pair of lugs 12 projecting from each side of the handle 7. Rearward of the pivots 11 the shanks 10 form normally diverging or spread arms 13, which are guided in apertures in a yoke 14; said yoke is slidable on the arms 13 and on the front portion 7ª of the handle, and is fixed at the front end of a flat operating bar 15, having its rear end provided with a finger catch 16. Said bar 15 is resilient and has a normal tendency to spring upward to the position shown in dotted lines 15 in Fig. 1; but it is always held in straight position upon the handle by a staple or guide 17, and is thus at all times in sufficient frictional contact with the handle to hold the crosshead 14 in any desired position.

In the modification shown in Figs. 5 and 6 the two side lugs 12 in Fig. 1 are changed to a single lug 12ª, pivoted in a slot 18 formed in each shank 10. The pivots 11 are the same in all the views, and the shanks are widened at 19 to compensate for the weakening caused by the holes for the pivots 11.

In the operation the side members 9 are closed or spread by pulling or pushing at the thumb piece 16.

What I claim is:—

1. A combined spoon and fork comprising a handle and extending forward from the handle a central middle tine and a short distance therefrom provided with lateral lugs, two side tines having rigid shanks pivoted to the lugs and normally diverging rearward of the pivots, an operating rod guided to slide upon the handle and having at its front end a crosshead with apertures for said shanks, and means for holding the slide in any desired position.

2. The structure specified in claim 1, said tines when closed together forming the bowl of a spoon.

3. The structure specified in claim 2, said operating bar being normally arched and resilient and slidable in straight position in a guide on the handle, so as to have frictional contact with the latter.

In testimony whereof I affix my signature.

ALBERT LARSON.